April 2, 1946.  T. G. HARE  2,397,858
POWERED BICYCLE
Original Filed March 25, 1943  2 Sheets-Sheet 1
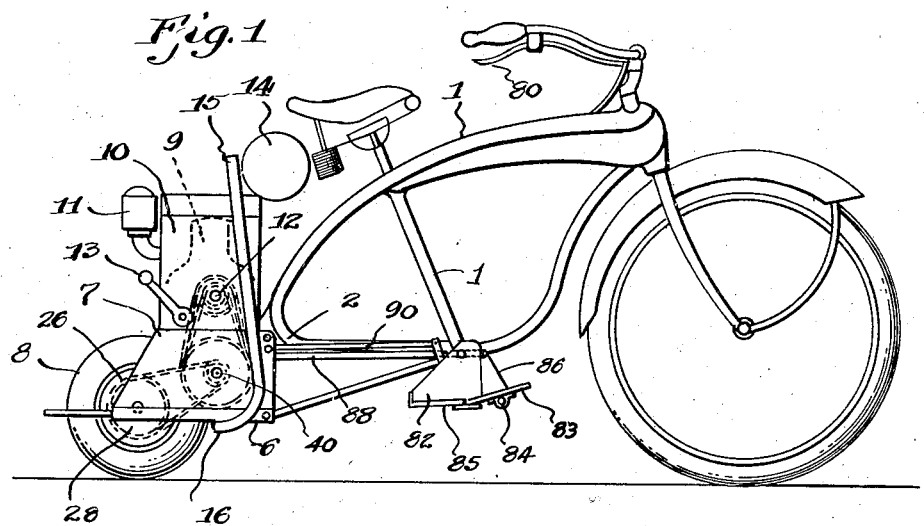
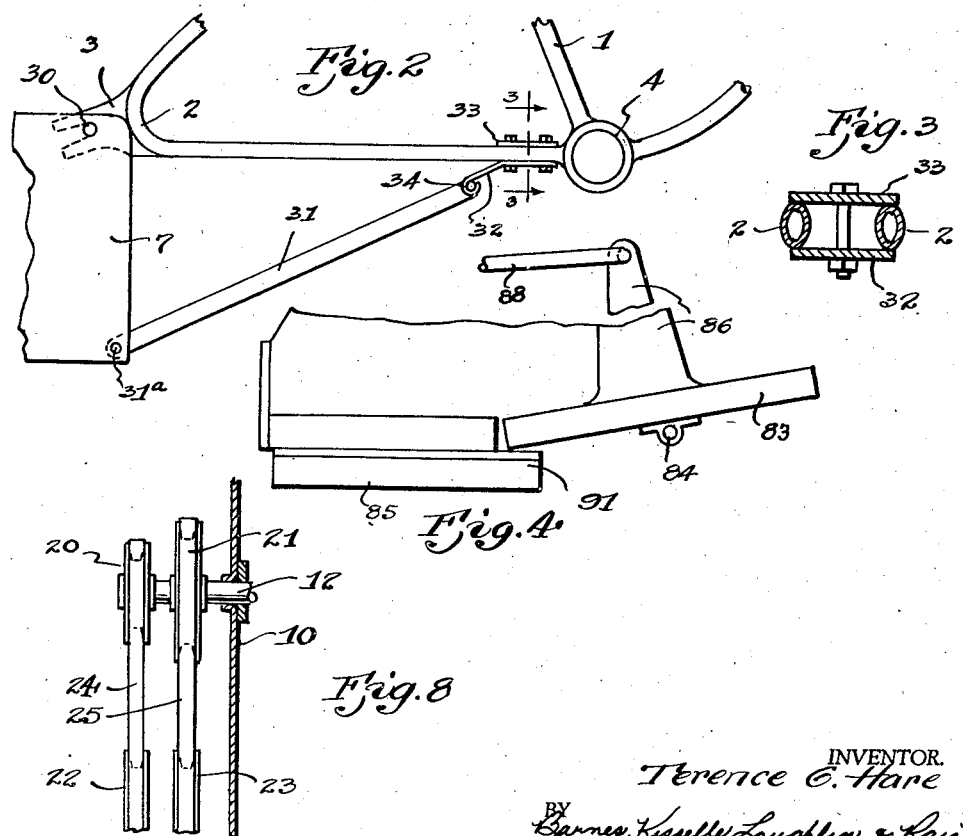
INVENTOR.
Terence G. Hare
BY
Barnes, Kisselle, Laughlin & Raisch
Attorneys

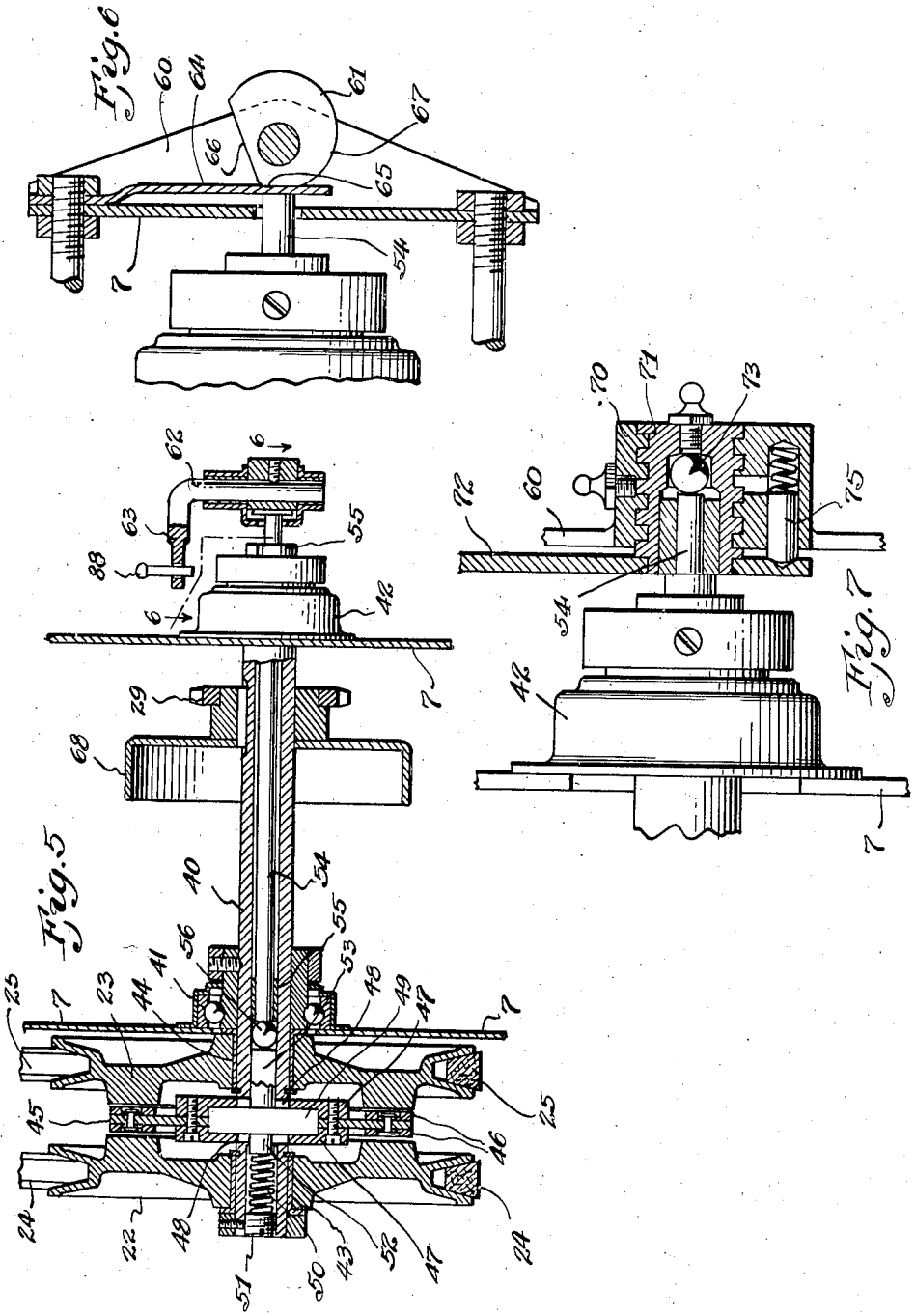

Patented Apr. 2, 1946　　　　　　　　　　　　　2,397,858

UNITED STATES PATENT OFFICE 2,397,858

POWERED BICYCLE

Terence G. Hare, Saginaw, Mich., assignor to Amesbury Seat Manufacturing Company, a corporation of Michigan Original application March 25, 1943, Serial No. 480,440, now Patent No. 2,379,901, dated July 10, 1945. Divided and this application January 18, 1945, Serial No. 573,443

3 Claims. (Cl. 180—33)

This invention relates to a self propelled vehicle in the nature of a powered bicycle.

The general object of the invention is to provide an improved economical means of transportation which can be obtained at a low cost and which is extremely economical from the stand point of consumption of fuel and rubber. In connection with this, general aim, improvements are made in a mechanism which comprises what may be termed a bicycle frame and a power unit. The arrangement of the power unit and its sub-frame is such that it may be easily attached to any bicycle, although the complete article including the bicycle frame and the power unit may be supplied and sold as such.

Among the improvements is an improved clutching arrangement whereby different speed and torque ratios can be had between the power unit and the driving wheel without the employment of speed change gears. The transmission of the power in any of the speed and torque ratios is direct from the engine to the driving wheel. Another improvement lies in the arrangement of the sub-frame of the power unit so that it can be quickly and easily attached to a bicycle frame and still another improvement lies in a control means used by the person operating the vehicle. This application is a division of application Serial No. 480,440, filed March 25, 1943, now Pat. No. 2,379,901 of July 10, 1945.

The accompanying drawings show means for carrying out the invention.

Fig. 1 is a side elevational view of the complete unit embodying a bicycle frame and a power unit.

Fig. 2 is an enlarged view showing the manner of attachment of the power unit frame to the bicycle frame.

Fig. 3 is an enlarged cross-section taken on line 3—3 of Fig. 2.

Fig. 4 is an enlarged detail view of a pedal control.

Fig. 5 is a detail view largely in section as showing the power transmitting means for effective different speed and torque ratios.

Fig. 6 is an enlarged view, partly in plan and taken substantially on line 6—6 of Fig. 5.

Fig. 7 is a view partly in cross-section showing a different form of control.

Fig. 8 is a diagrammatic view showing part of the driving mechanism.

A bicycle frame is generally indicated at 1 in Fig. 1 and it has the well-known elements including a seat, handle bars, front wheel and fork therefore all of which need no detailed description. As shown in Fig. 2 the frame has the usual fork forming frame parts 2 with the projecting clevises 3 which in the customary manner usually receives the rear wheel of the bicycle. The manually operated pedals of the bicycle are removed but they are usually mounted in the bearing opening 4 of the frame. The power unit is connected to the frame by first removing the rear wheel. This power unit has its own frame which may be termed a sub-frame as shown at 6 having side plates 7 (Fig. 5). A driving wheel 8 is journaled in the sub-frame, while an engine of the internal combustion type, such as a gasoline engine, is mounted on the side plates 7. This engine is generally illustrated in dotted lines as shown at 9, and it may be encased in a housing generally shown at 10. The carburetor of the engine is illustrated at 11 and its crank shaft at 12. A starter crank is shown at 13, and a fuel tank at 14. A protection bar 15 may extend down each side of the power unit and over the top of the engine and secured to the bottom of the sub-frame substantially at 16 to protect any of the parts from striking the ground in case the vehicle is dropped or falls over on its side.

Mounted on the crank shaft of the engine are two pulleys preferably designed to take belts. These two pulleys are of different size as of 20 and 21. These two belts operate two driving clutch pulleys 22 and 23 as shown in Figs. 5 and 8. The belt connecting the pulleys 20 and 22 is shown at 24, and the belt connecting the pulleys 21 and 23 is shown at 25. The driving wheel 8 is driven by one or the other of these pulley and belt combinations advantageously by means of a chain 26 operating over a sprocket 28 attached to the driving wheel and a sprocket 29 driven by either the pulley 22 or the pulley 23 as selected.

The sub-frame is attached to the bicycle frame as shown in Fig. 2. The sub-frame is secured to the clevises 3 as by means of a bolt 30, while a stabilizing tension member 31 is pivotally secured to the sub-frame as at 31a and to the bicycle frame. A bracket 32 may be clamped to the bars by clamp plate 33, (Figs. 2 and 3), and the stabilizing member 31 is attached to the bracket as shown at 34. It will be observed that bracket 32 may be attached to the frame bars 2 in one of several positions lengthwise of the bars 2 so that the power unit can be mounted upon various sized bicycle frames. In other words, a bicycle frame larger than the one shown may have bars 2 which are longer than those indicated, in which event, the bracket 32 may be clamped to the bars at the correct distance from the bolt 30. The weight of the bicycle frame and the weight of the rider tends to break the joint 30 downwardly, since the wheel 28 is rearward of this position, but the stabilizing member 31 is placed under tension and thus holds the sub-frame strongly positioned on the bicycle frame. The result is a stiff triangular connection, the triangle having its points at 30, 31a and at the fulcrum plate 32.

The power transmitting arrangement, as shown in Fig. 5, comprises a shaft 40 journaled in the frame plate 7 by bearings 41 and 42. The shaft is hollow and it projects beyond one of the plates 7 for the reception of the driving pulleys 22 and 23. The pulley 22 is freely journalled on the shaft by a suitable bearing 43, and pulley 23 is freely journalled on the shaft by a bearing 44. A clutch driven disc 45 has clutch facings 46 on opposite sides thereof, and is positioned between the driving pulleys. The driving pulleys having friction faces, as shown, for engaging the corresponding faces on the driven discs. The hub of the driven disc may comprise two matching hub pieces 47 suitably keyed or otherwise fastened to the shaft 40. The shaft 40 has elongated slots 48 through which passes a control piece 49 which is tightly engaged between the hub elements 47 and which is slidable lengthwise of the shaft 40 in the slots. This control piece 49 may provide the driving connection between the driven disc and the shaft, although the hub element 47 may be splined to the shaft so that it can shift lengthwise of the shaft.

The control for obtaining different speed and torque ratios is by shifting the driven disc lengthwise of the shaft 40 to bring it into frictional engagement with one or the other of the driving pulleys. A coil spring 50 is disposed within the hollow shaft and it is backed by plug reaction member 51. The spring exerts its force on the member 49, advantageously through an engaging piece 52. Another engaging piece 53 is positioned on the opposite side of the control piece 49 and the action is controlled by a shiftable control rod 54 reciprocally mounted in the shaft in one or more bearings as shown at 55. Preferably a ball 56 is disposed between the piece 53 and the rod 54 to take the thrust and to provide for relative rotation.

To control the clutch, a bracket 60 is secured to the frame plate 7 and it carries a cam 61 mounted on a shaft 62 having an operating arm 63. This cam operates on the end of the rod 54 preferably through the means of a flexible plate 64 which takes side thrusts of the cam off the rod. The cam has a face 65 for neutral position, a face 66 for high ratio position and it may have just a curved surface 67 for low ratio position. Considering Figs. 5 and 6, it will be noted that the driven disc 45 is more or less centralized between the two driving pulleys but not engaged with either. The spring 50 is urging the driven disc toward engagement with the face 65 of the cam. If the cam be turned to position the face 66 adjacent the end of the rod 54, the spring 50 then urges the driven disc 45 into driving engagement with the pulley 23. If the cam be rotated to bring the surface 67 opposite the end of the rod 54, the rod 54 is shifted to the left against the spring, and the driven disc moves into frictional driving engagement with the driving pulley 22. When the parts are in neutral position, the engine and both driving pulleys operate freely. When the driven disc is engaged with the driving pulley 23, the pulley 22 idles freely on its bearing, at a different speed, of course, than the pulley 23 because of the different size pulleys 20 and 21 on the engine shaft. When the driven disc is in engagement with driving shaft 22 the pulley 23 freely idles. Thus relatively low and relatively high speed and torque ratios can be effected by simply shifting the driven clutch disc. The bearings for the two driving pulleys may be of any suitable type. Also mounted on the shaft 40 is a brake drum 68.

A modified form of control is shown in Fig. 7. In this form a member 70 having an internal screw-thread is carried by the bracket 60 and a cooperating member 71 with an external screw-thread is mounted therein and provided with an operating arm 72. Within the member 71 is a ball 73 which permits rotation of the shaft 54 as it may tend to rotate with the shaft 40. Turning the member 71 by its arm 72 causes the shaft 54 to be shifted to the left against the spring or permits the shaft 54 to shift to the right under the action of the spring. The member 70 may carry a suitable spring pressed detent for cooperating in notches in the member 72 to hold the adjustments in high, low or neutral positions.

A suitable throttle is shown at 80. There are two other controls which may be governed by the two feet of the operator. One is for shifting the cam 61 or screw 71 for obtaining high and low ratios, and the other is for applying the brake. As shown in Figs. 1 and 4, a bracket 82 may be mounted to the frame in the journal 4 and this carries a control pedal 83 pivoted as at 84. To the rear of the control pedal is a foot rest and stop 85. An arm 86 connected to the pedal 83 is connected by a rod 88 to the control member 63. When the pedal 83 is free of pressure it takes an angular position substantially as shown, and the surface 66 of the cam permits the spring to shift the clutch driven disc 43 into engagement with the high ratio pulley 23. When the pedal is shifting clockwise the surface 65 pushes the rod 54 to in turn shift the driven clutch disc to neutral position; upon further clockwise shift of the pedal 83, the surface 67 comes into play and the driven disc is engaged with the low ratio pulley. This position is preferably maintained by the pressure of the operator's foot. Thus in starting the vehicle or in going up an incline the pressure is applied to the pedal to effect the low ratio condition. Upon release of the pedal, the parts assume the high ratio position by the action of the spring 50. A similar pedal arrangement is provided for the other foot of the operator and connected to suitable braking means by a rod 90. When operating in a normal condition, the foot of the operator may be brought to rest on the support 85. This support also provides a stop for the counterclockwise movement of the pedal 83, as at 91. Thus a comfortable position is provided and the clutch may be shifted to neutral or low by applying pressure of one foot and the brake may be applied by applying pressure of the other foot.

I claim:

1. A powered bicycle comprising a frame having clevises for attachment of a wheel axle, a power unit sub-assembly having a sub-frame with an engine mounted thereon and a traction wheel adapted to be driven by the engine; means attaching the sub-frame to said clevises with the sub-frame extending downwardly therefrom, a tension member connected to the sub-frame at a point adjacent the lower portion of the sub-frame and substantially under the clevises, and means adjustably connecting the tension member to the bicycle frame in a plane approximating the horizontal plane of the clevises, whereby to provide a three-point connection between the bicycle frame and the sub-assembly.

2. A powered bicycle comprising a frame having clevises for attachment of a wheel axle, a power unit sub-assembly having a sub-frame with an engine mounted thereon and a traction wheel adapted to be driven by the engine, means attaching the upper forward edge of the sub-frame to the clevises with said sub-frame extending downwardly therefrom, a tension member, means attaching the tension member to the forward lower portion of the sub-frame, said tension member extending forwardly and inclined upwardly from the sub-frame, and means connecting the forward end of the tension member to the bicycle frame, whereby a three-point triangle forming attachment between the bicycle frame and sub-frame is provided.

3. A powered bicycle comprising a frame having clevises for attachment of a wheel axle, a power unit sub-assembly having a sub-frame with an engine mounted thereon and a traction wheel adapted to be driven by the engine, means pivotally attaching the upper forward edge of the sub-frame to the clevises with said sub-frame extending downwardly therefrom, a tension member, means pivotally attaching the tension member to the forward lower portion of the sub-frame, said tension member extending forwardly and inclined upwardly from the sub-frame, a bracket, means for attaching the bracket to the bicycle frame at one of various adjustable positions depending upon the relative length of the tension member and dimensions of the bicycle frame, and means providing a pivotal connection between the forward end of the tension member of said bracket, whereby to provide a three-point triangle forming connection between the bicycle frame and the sub-frame of the power unit.

TERENCE G. HARE.